March 23, 1965 H. R. SORBER ETAL 3,174,659
MATERIAL DISPENSING PACKAGE
Filed June 29, 1962
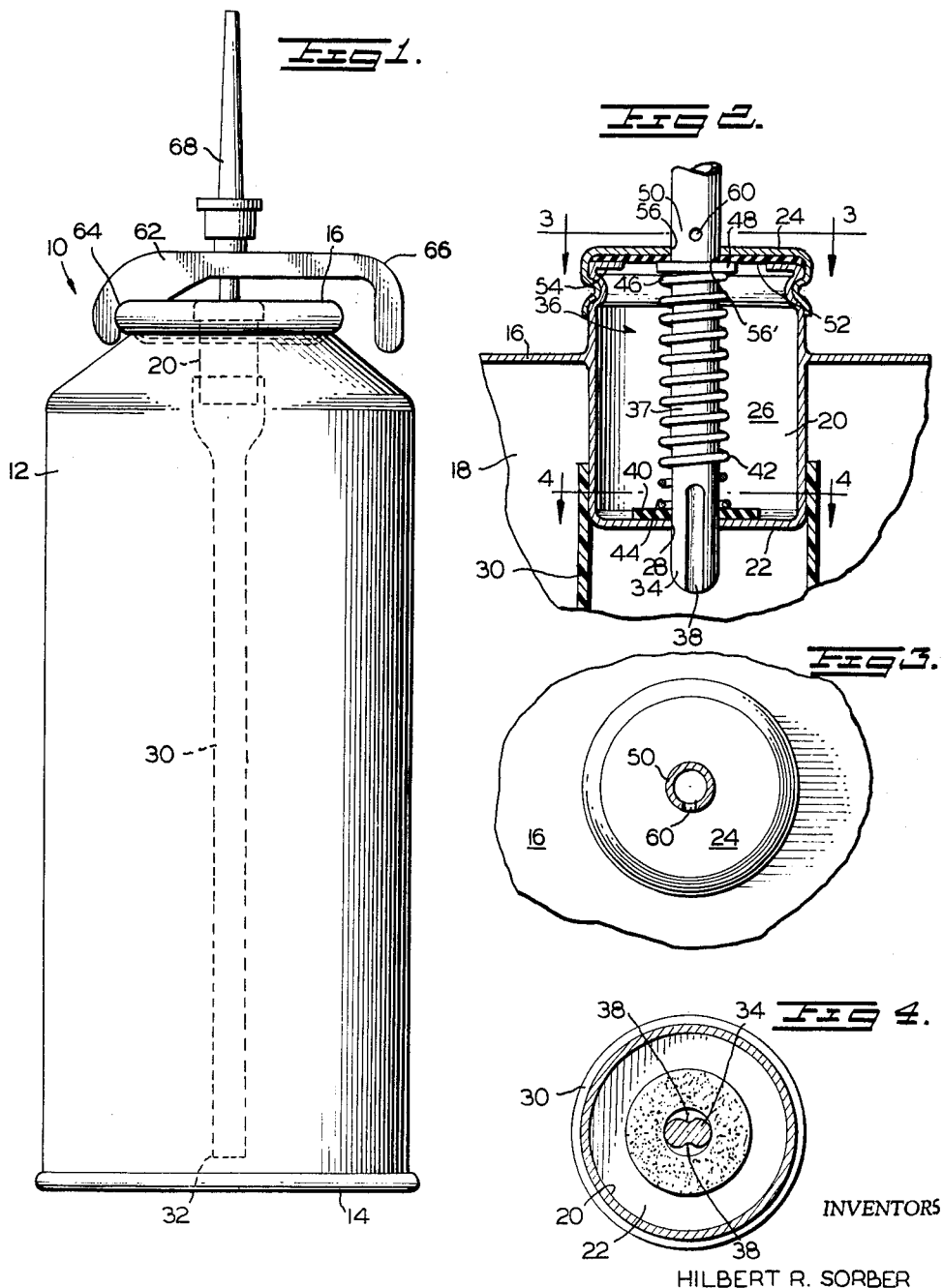
INVENTORS
HILBERT R. SORBER
JOHN YAKUBIK
BY *Stowell & Stowell*
ATTORNEYS 3,174,659
MATERIAL DISPENSING PACKAGE
Hilbert R. Sorber, Avenel, and John Yakubik, Colonia, N.J., assignors to Schering Corporation, Bloomfield, N.J., a corporation of New Jersey
Filed June 29, 1962, Ser. No. 206,490
5 Claims. (Cl. 222—394)

This invention relates to improvements in material dispensing packages and specifically to packages for accurately dispensing metered quantities of aerosols.

It is a primary object of the present invention to provide a dispensing package that will accurately dispense a predetermined volume of an aerosol upon each actuation of the package valve means.

Another object is to provide such a device that is suitable for operation at sufficiently low pressure that inexpensive containers may be safely utilized.

These and other objects and advantages are provided in a dispensing package comprising a container having a reservoir chamber and a metering chamber, controlled inlet and outlet means for the metering chamber, the inlet means including a conduit providing fluid communication between the lower end of the reservoir and the metering chamber, the outlet means including orifice means providing communication between the metering chamber and the atmosphere, unitary valve means associated with the conduit means and the orifice means normally open to fluid flow through the conduit means and closed to fluid flow through the orifice means, the unitary valve being operable to close fluid flow through the conduit means and open fluid flow through the orifice means, a dispensable composition and a propellant composition in the reservoir chamber, the propellant composition including at least a propellant liquid having a vapor pressure of from about 20 to about 80 p.s.i.g. at 70° F. and a gaseous propellant charged at a pressure of from about 10 to about 50 p.s.i.g. at 70° F. and non-condensable at 100 p.s.i.g. at 70° F.

The invention will be more particularly described with reference to the accompanying drawings wherein:

FIG. 1 is an elevational view of a package embodying the principles of the present invention;

FIG. 2 is an enlarged fragmentary detailed view of a portion of the metering chamber, the reservoir chamber and the unitary valve means of the package illustrated in FIG. 1;

FIG. 3 is a section on line 3—3 of FIG. 2; and

FIG. 4 is a section on line 4—4 of FIG. 2.

Referring to the drawings, 10 generally designates a material dispensing package generally comprising a container having a cylindrical side wall 12, a bottom 14 and a top 16. The cylindrical side wall 12, the bottom 14 and the top 16 generally define a reservoir chamber 18.

The top 16 rigidly supports a further container having a cylindrical wall portion 20, a bottom wall 22 and a top wall 24. The cylindrical wall 20 with its top and bottom walls 22 and 24 generally define a metering or controlled volume outlet chamber 26.

The metering or controlled volume outlet chamber 26 has communication with the reservoir chamber 18 and the atmosphere.

Communication between the metering chamber 26 and the reservoir chamber 18 is through an opening 28 in the lower end of the metering chamber. The opening 28 communicates with the interior of a dip tube 30 which is illustrated as snugly engaging the cylindrical wall 20 of the metering chamber and extending downwardly into the reservoir chamber and terminating at end 32 just above the bottom 14 of the package 10 whereby a liquid emulsion, suspension or the like maintained in the reservoir chamber 18 is normally forced through the tube into the metering chamber 26 by a propellant composition as to be more fully described hereinafter.

The opening 28 slidably receives the lower portion 34 of a unitary reciprocating valve device generally designated 36 having an elogated stem 37. The lower portion 34 of the unitary valve structure 36 is provided with a pair of elongated grooves 38 (FIGS. 2 and 4) with the upper end of the grooves 38 normally extending interiorly of the metering chamber 26 whereby the aerosol composition to be directed from the reservoir 18 into the metering chamber 26 may flow from the conduit 30 via the grooves 38 into the metering chamber 26.

A resilient sealing member 40 having a cylindrical bore therein fits about the lower stem portion 38 in the manner illustrated in FIG. 4, and is maintained in abutting relationship with the inner surface of the bottom 22 of the metering chamber 26 by a helical spring 42 which is slidably received about the stem 37 of the valve means 36 and bears at it lower end 44 against the upper surface of the sealing member 40 while the upper end 46 of the spring 42 bears against a ferrule 48 secured to the upper portion 50 of the stem 37. Thus, the spring maintains the sealing member 40 in its illustrated position and also urges the valve stem 37 into its illustrated position whereby the grooves 38 normally maintain the hereinbefore described fluid communication between the metering chamber 26 and the interior of the conduit 30.

The top portion 24 of the metering chamber 26 is in fluid tight assembly with the cylindrical walls of the metering chamber and a further resilient sealing means 52 is maintained in contact with the inner surface of the top wall 24 by the cooperation between the inner surface of the top wall and a flange 54 formed from the wall portion 20 of the metering chamber. An opening 56 in the top 24 and 56' in the sealing member 52 are axially aligned with the corresponding openings 28 in the bottom wall 22 and the opening in the annular sealing member 40.

The diameter of the upper portion 50 of the valve stem 37 is sized to snugly engage the inner surface of the opening in the sealing member 52 and this snug engagement in cooperation with the ferrule 48 effectively provides a seal between the atmosphere and the interior of the metering chamber. The upper portion 50 of the valve stem 37 is of hollow construction as more clearly shown in FIG. 3 and at least one radial bore 60 opens through the wall of the upper portion 50. The location of the opening 60 in relationship to the sealing member 52 and in relation to the upper end of the grooves 38 in the lower stem portion 34 is so selected that when the stem 37 is depressed, the sealing member 44 at the lower end of the metering chamber closes off communication between the interior of the dip tube 30 and the metering chamber prior to the time the opening 60 enters the metering chamber after passing through the opening in the sealing member 52 to provide communication between the material under pressure in the metering chamber 26 and the atmosphere.

As illustrated in FIG. 1, the means for depressing the unitary valve stem 37 against the resiliency of helical spring 42 comprises a lever member 62 having a fulcrum point 64, a finger engaging portion 66 and an outlet spout 68, which is preferably of the disposable type or the outlet 68 may comprise a reusable member of the type disclosed in U.S. patent application Serial No. 148,909, filed October 31, 1961, which application also discloses a metering type container which may satisfactorily be employed in carrying out the teachings of the present invention.

From the foregoing description, it will be seen that when the reservoir chamber 18 of the dispensing package 10 is charged with a dispensable composition and a propellant composition that the pressure developed within the reservoir chamber normally forces the dispensable composition along with a portion of the liquified propellant composition into the reservoir chamber 26 when the unitary valve structure is in the position as illustrated in FIG. 2. When it is desired to dispense the metered quantity of material in the chamber 26, the lever 62 is depressed, closing the lower valve structure providing communication between the metering chamber and the interior of the dip tube 30 and then opening communication between the outlet spout 68 and the metering chamber 26 through the bore in the upper end 50 of the valve stem 37 through the axial bore 60.

Metering dispensing type aerosol packages have been found to function properly where the volume to be metered is less than about 1 ml. Where the quantity of material is to be dispensed, upon each operation of the valve mechanism of such metering type dispensers, is greater than 1 ml., it has been found that the volume of material dispensed upon each actuation of the conventional valve means is substantially less than the volume of the metering chamber. Further, it has been found that the volume dispensed varies substantially during operation of the same package as the metering chamber generally never completely fills where conventional condensable liquid propellants are employed.

It will be appreciated that when the valve stem 37 is depressed and the contents of the metering chamber 26 dispensed, the pressure within the metering chamber 26 is substantially about atmospheric pressure or possibly slightly below due to the cooling effect of the discharge of the pressurized material. When the valve is released to provide communication between the metering chamber and the reservoir chamber, the metering chamber 26 is never completely filled because a portion of the liquified propellant composition initially forced into the metering chamber volatilizes due to the relatively low pressure in the metering chamber and the volatilized propellant exerts a resisting pressure on the liquid flowing into the metering chamber. As filling of the chamber continues, the resisting pressure increases until the pressure in the metering chamber is in equilibrium with the pressure in the reservoir and further filling of the metering chamber stops notwithstanding that the metering chamber is not full and contains both aersol to be dispensed and a volume of gas formed by the volatilization of the liquifiable propellant composition.

It has been found that the undesirable effect created by using a condensable propellant composition in a metering type aerosol dispensing device is overcome by combining with the condensable propellant a gaseous propellant which is non-condensable at pressures normally to be encountered within the reservoir chamber of the dispensing device. The non-condensable portion of the propellant composition acts as a spring within the reservoir chamber, always exerting a pressure on the liquid surface in the reservoir chamber, whereby filling of the metering chamber will be complete as the excess pressure of the non-condensable gas in the reservoir chamber overcomes the normal equilibrium which would exist between the reservoir chamber and the metering chamber where only a condensable propellant is employed.

The condensable or liquid propellant composition may comprise either or both the halogen substituted and non-substituted hydrocarbons conventionally used as propellants in aerosol type dispensing devices. Preferably, the propellant or propellant mixture should have a partial pressure of from about 20 to about 80 p.s.i.g. at 70° F. The condensable propellant is preferably employed in quantities of from 10 to 50% by weight of the total dispensable material with about 50% by weight of the liquifiable propellant comprising the preferred charge.

The non-condensable gaseous propellant may comprise any of the generally inert gases which do not liquify at pressures and temperatures normally encountered in conventional aerosol type dispensing packages. Suitable gases for use as a proportion of the propellant composition may comprise nitrogen, nitrous oxide and carbon dioxide charged into the partially filled reservoir chamber of the dispensing device at from about 10 to about 50 p.s.i.g. at 70° F. to provide a gas pressure of from about 20 to about 100 p.s.i.g. at 70° F. when the container is charged with the condensable propellant and preferably from about 50 to about 80 p.s.ig. at 70° F.

The active material to be dispensed may comprise any liquid, slurry or emulsion compatible with the liquifiable and gaseous propellant composition. However, the invention has particular utility in dispensing medicinal compositions where the volume of the material to be dispensed each time the valve mechanism is actuated is critical.

The assembly illustrated in FIG. 1 of the drawings when charged with both a condensable and non-condensable propellant and a suitable active ingredient has been particularly useful in the treatment of bovine mastitis as an accurately metered quantity of the active ingredient may be administered into each teat upon application of the valve mechanism. The invention also has utility for intarnasal, intaranal and intarvaginal therapy and as a convenient intarvaginal application of contraceptive foams and the like.

While a wide variety of condensable propellant may be employed within the scope of the present invention, particularly useful propellants have been found to be trichloromonofluromethane, dischorodifluromethane, dichlorotetrafluoroethane, monochlorodifluoroethane, 1, 1-difluroethane, and mixtures thereof. A preferred liquifiable propellant comprises 60% dichlorodifluoromethane and 40% dichlorotetrafluoroethane which has a partial pressure of about 55 p.s.i.g at 70° F.

*Example 1*

A container having a reservoir capacity of about 6 ounces and a metering chamber capacity of 10 gm. was filled to about 60% of the capacity of the reservoir with 40% by weight of a 60–40 mixture of dichlorodifluoromethane and dichlorotetrafluoroethane and 60% by weight of a therapeutic composition consisting of:

| | |
|---|---:|
| Hydrocortisone acetate ___gm/1000 doses__ | 30 |
| Neomycin sulfate _____do____ | 250 |
| Procaine pencillin G _____do____ | 100 |
| Chlorobutanol _____do____ | 50 |
| Polymixin B. sulfate _____units__ | 50,000,000 |
| Tween 65 _____gm/1000 doses__ | 1,200 |
| Peanut oil with 2% aluminum Monostearate q.s. _____do____ | 6,000 |

The reservoir chamber was first charged with the therapeutic composition and then charged with nitrogen to 40 p.s.i.g. at about 70° F. After charging the therapeutic composition and the nitrogen the condensable propellant was added to the reservoir chamber.

*Example 2*

A container having a reservoir capacity of about 6 ounces and a metering chamber capacity of 6 gm. was filled to about 60% of the capacity of the reservoir with 50% by weight of dichlorodifluoromethane and 50% by weight of a therapeutic composition consisting of:

| | Gm./1000 doses |
|---|---|
| Oxytetracycline | 200 |
| Oleandomycin | 100 |
| Neomycin sulfate | 100 |
| Prednisolone | 5 |
| Tween 65 | 750 |
| Peanut oil with 2% aluminum monostearate q.s. | 3000 |

The reservoir chamber was then charged with nitrogen to 25 p.s.i.g. at 70° F. The therapeutic composition, the nitrogen and the condensable propellant were charged in the same order as set forth in Example 1.

Example 3

A container having a reservoir capacity of about 6 ounces and a metering chamber capacity of 6 gm. was filled to about 60% of the capacity of the reservoir with 50% by weight of a 60–40 mixture of dichlorodifluoromethane and dichlorotetrafluoroethane and 50% by weight of a therapeutic composition consisting of:

| | Gm./1000 doses |
|---|---|
| Oxytetracycline | 200 |
| Oleandomycin | 100 |
| Neomycin sulfate | 100 |
| Prednisolone | 5 |
| Tween 65 | 750 |
| Peanut oil with 2% aluminum monostearate q.s. | 3000 |

The reservoir chamber was then charged with nitrous oxide to 45 p.s.i.g. at 70° F. The therapeutic composition was charged first, followed by the nitrous oxide and then the condensable propellant composition.

We claim:

1. In a dispensing package comprising a container having a reservoir chamber and a metering chamber, controlled inlet and outlet means for said metering chamber, said inlet means including a conduit providing fluid communication between the lower end of the reservoir and the metering chamber, said outlet means including orifice means providing communication between the metering chamber and the atmosphere, unitary valve means associated with said conduit means and said orifice means normally open to fluid flow through said conduit means and closed to fluid flow through the orifice means, said unitary valve being operable to close fluid flow through the conduit means and open fluid flow through the orifice means, a dispensable composition and a propellant composition in said reservoir chamber, the improvement which comprises using a propellant composition containing a propellant liquid having a vapor pressure of from about 20 to about 80 p.s.i.g. at 70° F. and a gaseous propellant charged at a pressure of from about 10 to about 50 p.s.i.g. at 70° F. and non-condensable at 100 p.s.i.g. at 70° F. whereby a greater pressure is maintained in said reservoir than in said metering chamber.

2. In a dispensing package comprising a chamber having a reservoir chamber and a metering chamber, controlled inlet and outlet means for said metering chamber, said inlet means including a conduit providing fluid communication between the lower end of the reservoir and the metering chamber, said outlet means including orifice means providing communication between the metering chamber and the atmosphere, unitary valve means associated with said conduit means and said orifice means normally open to fluid flow through said conduit means and closed to fluid flow through the orifice means, said unitary valve being operable to close fluid flow through the conduit means and open fluid flow through the orifice means, a dispensable composition and a propellant composition in said reservoir chamber, the improvement which comprises using a propellant composition containing a propellant liquid having a vapor pressure of from about 20 to about 80 p.s.i.g. at 70° F. and a gaseous propellant charged at a pressure to provide a final pressure of from about 20 to about 100 p.s.i.g. at 70° F. and non-condensable at 100 p.s.i.g. at 70° F. whereby a greater pressure is maintained in said reservoir than in said metering chamber.

3. In a dispensing package comprising a container having a reservoir chamber and a metering chamber, controlled inlet and outlet means for said metering chamber, said inlet means including a conduit providing fluid communication between the lower end of the reservoir and the metering chamber, said outlet means including orifice means providing communication between the metering chamber and the atmosphere, unitary valve means associated with said conduit means and said orifice means normally open to fluid flow through said conduit means and closed to fluid flow through the orifice means, said unitary valve being operable to close fluid flow through the conduit means and open fluid flow through the orifice means, a dispensable composition and a propellant composition in said reservoir chamber, the improvement which comprises using a propellant composition containing a propellant liquid selected from the group consisting of trichloromonofluoromethane, dichlorodifluoromethane, dichlorotetrafluoroethane, monochlorodifluoroethane, 1,1-difluoroethane, and mixtures thereof having a vapor pressure of from about 20 to about 80 p.s.i.g. at 70° F. and a gaseous propellant selected from the group consisting of nitrogen, nitrous oxide, and carbon dioxide charged at a pressure of from about 10 to about 50 p.s.i.g. at 70° F. whereby a greater pressure is maintained in said reservoir than in said metering chamber.

4. In a dispensing package comprising a container having a reservoir chamber and a metering chamber, controlled inlet and outlet means for said metering chamber, said inlet means including a conduit providing fluid communication between the lower end of the reservoir and the metering chamber, said outlet means including orifice means providing communication between the metering chamber and the atmosphere, unitary valve means associated with said conduit means and said orifice means normally open to fluid flow through said conduit means and closed to fluid flow through the orifice means, said unitary valve being operable to close fluid flow through the conduit means and open fluid flow through the orifice means, a dispensable and propellant composition in said chamber, the improvement which comprises using a propellant composition comprising from about 10 to about 50% by weight of the dispensable composition and consisting of a liquid having a vapor pressure of about 20 to about 80 p.s.i.g. at 70° F. and a gaseous propellant charged at a pressure of from about 10 to about 50 p.s.i.g. at 70° F. and non-condensable at 100 p.s.i.g. at 70° F. whereby a greater pressure is maintained in said reservoir than in said metering chamber.

5. In a dispensing package comprising a container having a reservoir chamber and a metering chamber, controlled inlet and outlet means for said metering chamber, said inlet means including a conduit providing fluid communication between the lower end of the reservoir and the metering chamber, said outlet means including orifice means providing communication between the metering chamber and the atmosphere, unitary valve means associated with said conduit means and said orifice means normally open to fluid flow through said conduit means and closed to fluid flow through the orifice means, said unitary valve being operable to close fluid flow through the conduit means and open fluid flow through the orifice means, a dispensable and propellant composition in said reservoir chamber, the improvement which comprises using a propellant composition comprising about 40% by weight of the material placed in said reservoir chamber and consisting of a propellant liquid having a vapor pressure of about 55 p.s.i.g. at about 70° F. and nitrogen charged at a pressure to provide a final gas pressure in the container of from about 50 to about 80 p.s.i.g. at 70°

F. whereby a greater pressure is maintained in said reservoir than in said metering chamber.

References Cited by the Examiner

UNITED STATES PATENTS

| | | | |
|---|---|---|---|
| 1,990,499 | 2/35 | Odell | 222—394 X |
| 2,070,167 | 2/37 | Iddings | 167—39 X |
| 2,723,200 | 11/55 | Pyenson | 99—171 |
| 2,728,495 | 12/55 | Eaton | 222—394 |
| 2,788,925 | 4/57 | Ward. | |
| 2,815,889 | 12/57 | Stetz et al. | |
| 2,964,165 | 12/60 | Riley | 252—305 X |
| 2,995,278 | 8/61 | Clapp. | |
| 3,003,662 | 10/61 | Mesberg. | |
| 3,089,625 | 5/63 | Sober et al. | 222—509 X |
| 3,109,625 | 11/63 | Steiman et al. | 25—353 |
| 3,128,924 | 4/64 | Gorman | 251—353 X |

OTHER REFERENCES

Pressurized Packaging (Aerosols), pages 75–6, 165–6; Butterworths Scientific Publications, London, 1958.

Aerosols, Science and Technology, pages 220, 291, 326, 412, 413; Interscience Publishers, Inc., New York, 1960.

Modern Packaging, article titled The Status of Food Aerosols, pages 122–3, February 1961.

RAPHAEL M. LUPO, *Primary Examiner.*